Figure 1:
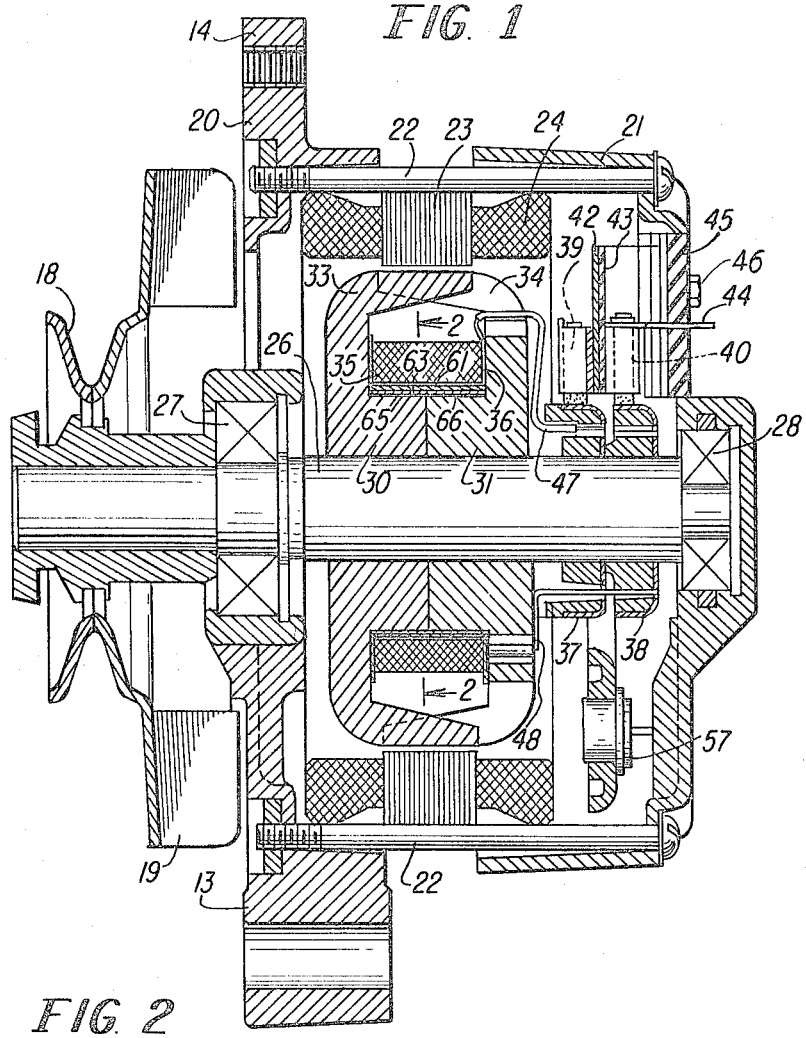

Feb. 21, 1967  C. L. SHANO  3,305,740
ROTOR ASSEMBLY
Filed Sept. 6, 1963  2 Sheets-Sheet 1

INVENTOR.
Charles L. Shano
BY
Attys.

Feb. 21, 1967  C. L. SHANO  3,305,740
ROTOR ASSEMBLY
Filed Sept. 6, 1963  2 Sheets-Sheet 2

INVENTOR.
Charles L. Shano
BY Mueller & Aichele
Attys.

United States Patent Office 3,305,740
Patented Feb. 21, 1967

3,305,740
ROTOR ASSEMBLY
Charles L. Shano, Morton Grove, Ill., assignor to Motorola Inc., Franklin Park, Ill., a corporation of Illinois
Filed Sept. 6, 1963, Ser. No. 307,082
4 Claims. (Cl. 310—42)

This invention relates to inductive electrical machines, and more particularly to an improved rotor assembly for such machines.

Certain electrical machines, utilizing relatively moving inductances to either produce electric current from mechanical motion or vice versa, utilize a rotor comprised of a plurality of intermeshed pole pieces. These pole pieces project from a hub upon which an inductance coil is wound to provide the magnetization of the pole pieces. In such devices it is desirable to minimize relative movement between the constituent parts in order to reduce noise and chatter and maintain satisfactory efficiency. In addition, such noise and chatter may cause audible interference with proximate radio equipment, such as the effect of an alternator or generator on a car radio.

It is possible in such devices to construct the pole pieces to be integral with the hub. This will, of course, eliminate relative movement between the pole pieces on each hub, but not necessarily between the pole pieces on opposite hubs. In order to place the winding on the hub where the pole pieces are intgeral with the hub, it is necessary that the hub be separable into two portions. Accordingly, when the device is assembled, the hubs must be locked together to prevent relative movement therebetween. If screws, bolts, or similar connections are used, they may add considerably to the cost of materials and may necessitate additional amounts of assembly time.

Such devices present a further problem with respect to the inductance winding itself. When the hub is in two pieces, it is usually necessary to wind the inductance coil separately and then slip it over the hub as the two parts thereof are brought together. A significant disadvantage of such a construction is that slippage may occur between the inductance coil and the hub, putting strain on the leads to the slip rings, and possibly breaking them.

Accordingly, it is an object of this invention to provide an improved low cost rotor assembly for use in an inductive electrical machine, which rotor has little relative movement between its constituent parts.

Another object of the invention is to provide a split hub type rotor assembly of simple structure which is readily assembled and locked together without screws, bolts or the like.

Still another object of the invention is to provide a split hub type rotor assembly wherein slippage between the inductance winding and the hub is prevented.

A feature of the invention is the provision of a split hub type rotor assembly for an inductive electrical machine which includes a sleeve with a winding thereon fitting over the hub and keyed thereto.

Another feature of the invention is the provision, in a rotor assembly for an inductive electrical machine, of separable hub portions with mutually aligned grooves therein and a sleeve with an internally projecting lap joint fitting in the grooves, which sleeve carries the inductance winding.

Still another feature of the invention is the provision of a rotor assembly for an alternator which includes a hub having two adjacent separable portions each having integral intermeshing pole pieces extending therefrom, and which further includes mutually aligned axial grooves in the hub portions which receive the internally projecting lap joint of a sleeve mounted on the hubs and carrying the field winding.

Figure 2:
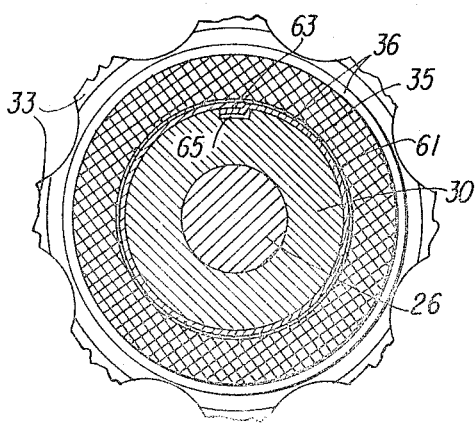
Figure 3:
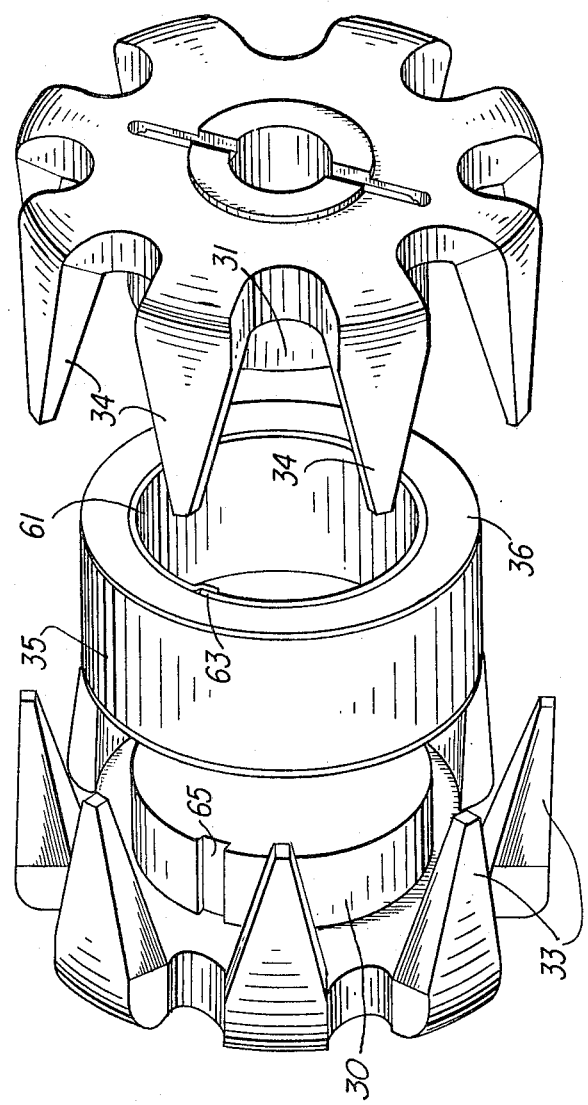

In the drawing:
FIG. 1 is a side elevational half section view of an alternator constructed in accordance with the invention;
FIG. 2 is a sectional view taken along the line 2—2 of FIG. 1; and
FIG. 3 is an exploded view of the rotor assembly of the alternator.

In accordance with the invention, a rotor assembly for an inductive electrical machine includes a pair of separable hub portions, each having a plurality of integral pole pieces extending therefrom and defining a cavity therewith. The hub portions are disposed in axial alignment with their ends abutting and with the respective pole pieces intermeshed. A sleeve is mounted on the hub portions and an inductance coil, which may be, for example, the field winding of an alternator, is wound on the sleeve and carried thereby. Each of the hub portions is provided with an axial groove in the periphery thereof. These grooves are mutually aligned and receive an inwardly extending lap joint of the sleeve to secure the sleeve against rotation relative to the hub portions. The sleeve further cooperates with the aligned grooves in the hub portions to prevent relative movement between the hub portions as the rotor assembly is being mounted on the drive shaft of the machine.

Referring now to FIG. 1, the general construction of an alternator having a rotor assembly constructed in accordance with the invention is shown. A front housing section 20 is secured to a back housing section 21 by a plurality of bolts 22. Secured between the housing sections is a laminated magnetic structure 23 of the stator of the alternator. Windings 24 are disposed on the laminated magnetic structure 23. The alternator has a mounting projection 13 which may be connected to a convenient support, and a second projection 14 which is adjustable for further supporting connection. A pulley 18 is provided for belt drive of the alternator and includes a fan 19 integral therewith for cooling the various elements of the alternator.

Pulley 18 and integral fan 19 are secured to a rotary drive shaft 26 which is supported in front frame 20 by bearing 27 and supported in back frame 21 by bearing 28. A rotor assembly, the details of which will be subsequently explained, is mounted on shaft 26 to be driven thereby. Connection is made from the rotor assembly to a pair of slip rings 37 and 38. A pair of brushes 39 and 40 are mounted to engage the individual slip rings 37 and 38. The brushes 39 and 40 are supported on a channel shaped bracket 42 connected to the back housing section 21. The brush 39 is inductively connected to the conducting bracket 42 to furnish a ground connection from the housing to one side of the rotor winding. The brush 40 is mounted on insulating plate 43 and is thereby insulated from the housing of the generator. Connection is made to the brush 40 through connecting arm 44 which extends from the brush 40. The arm 44 extends through an opening in insulating cover 45. The exciting current of the field winding carried by the rotor is therefore applied between arm 44 and the frame housing of the alternator which forms a reference or a ground point. The current in the stator winding 24 may be rectified by various diodes mounted in the alternator itself, for example, diode 57.

The rotor assembly is comprised of a magnetic structure which includes a pair of cylindrical cores or hubs 30 and 31. Each of the hubs has eight inturned pole pieces or fingers 33 and 34 which are intermeshed and interspersed with each other. A winding 35 is wound about the hubs 30 and 31 on a bobbin 36, which may be of convenient insulating material such as paper. Winding 35 is contained in a cavity formed between pole pieces 33 and 34 and their respective hubs 30 and 31, and is connected to slip rings 37 and 38 by leads 47 and 48 respectively.

Referring now to FIGS. 2 and 3, it may be seen that the winding is wound on its insulating bobbin 36 about a sleeve 61. Sleeve 61 may be constructed by rolling a piece of common cold rolled sheet stock into a sleeve and lap joining the seam. This lap joint 63 fits into grooves 65 and 66 formed on the surface of hubs 30 and 31. Grooves 65 and 66 are aligned to receive the inwardly extending lap joint 63. Of course, it would be possible to form other types of keying arrangements within the scope of the invention, however, the lap joint 63 is a convenient way of constructing the sleeve while at the same time forming a key.

Since pole pieces 33 and 34 are constructed integral with hubs 30 and 31, relative movement between pole pieces 33 and between pole pieces 34 is, of course, minimized. Nevertheless, if relative movement between pole pieces 33 and 34 occurs, interferring noise and chatter could result with a reduction in efficiency. The construction of the rotor assembly contemplated by the present invention prevents relative movement between teeth 33 and 34 without the need for screws, bolts and the like to secure the hubs together. Furthermore, slippage of the winding 35 relative to the pole pieces 33 and 34, and resultant damage to leads 47 and 48, is prevented in relatively simple fashion.

Referring particularly to FIG. 3 the assembly of the device is shown. The field winding is wound on the bobbin 36 tightly about sleeve 61 such that there is no relative slippage between any of the elements. Sleeve 61 provides support for the field winding and also prevents shrinkage or warping of the winding, as might occur when wound under tension. Assembly is thus made easier. Hubs 30 and 31 are placed facing each other with the grooves 65 and 66 aligned with the lap joint 63. The hubs are then brought together in abutting relationship, with the pole pieces intermeshing and the lap joint 63 cooperating with grooves 65 and 66 to align the hubs properly and prevent relative rotation therebetween. This unit is then force-fit on the shaft 26 which may be knurled and because of the relatively large area of contact between the hubs and the shaft, the gripping force will be sufficient to prevent relative movement between hubs 30 and 31, and between pole pieces 33 and 34.

It may therefore be seen that the invention provides an improved construction of a rotor assembly for use in an electric machine. The rotor assembly shown and described in this application is for use in an alternator and may be readily assembled, with an inwardly projecting lap joint on a sleeve which carries the field winding providing alignment between the two sections of the magnetic structure of the rotor assembly. The pole pieces are integral with the hubs and the hubs are prevented from relative movement during assembly by means of the inwardly projecting lap joint in corresponding grooves on the hubs.

I claim:

1. A rotor assembly for an inductive electrical machine, including in combination, a pair of separable hub portions each having a plurality of integral pole pieces extending therefrom and defining a cavity therewith, with the respective pole pieces being intermeshed, a sleeve member formed with an inwardly disposed lap joint and mounted on said hub portions, an inductance coil wound on said sleeve member to be carried thereby in said cavities, and an axial groove formed in each of said hub portions, said grooves being mutually aligned and receiving said lap joint of said sleeve member therein to secure said sleeve member against rotation relative to said hub portions, said lap joint of said sleeve member cooperating with said grooves in said hub portions to prevent relative movement between said hub portions.

2. A rotor assembly for use in an inductive electrical machine, including in combination, a pair of rotor portions, each comprising a projecting hub and a plurality of integral pole pieces extending therefrom and defining a cavity between said pole pieces and said hub, each of said hubs being axially aligned in abutting relation with said pole pieces intermeshed, each of said abutting hubs having an axial groove in the periphery thereof with said grooves being in mutual alignment, a sleeve surrounding the periphery of said abutting hubs and having an inwardly projecting lap joint extending into each of said aligned grooves and preventing rotary displacement of said sleeve with respect to said hubs, and an inductance coil wound on said sleeve to be carried thereby, said inductance coil being disposed in said cavities between said pole pieces and said hubs of said rotor portions, said rotor assembly thus comprised being readily assembled and having a minimum of relative movement between the constituent parts.

3. An alternator including in combination, a housing and armature winding means disposed therein, a drive shaft centrally of said housing and having a pair of rotor portions mounted thereon, each of said rotor portions comprising a projecting hub and a plurality of integral pole pieces extending therefrom and defining a cavity between said pole pieces and said hub, each of said hubs being axially aligned in abutting relation with said pole pieces intermeshed, each of said abutting hubs having an axial groove in the periphery thereof with said grooves being in mutual alignment, a sleeve surrounding the periphery of said abutting hubs and having an inwardly projecting lap joint extending into each of said aligned grooves and preventing rotary displacement of said sleeve with respect to said hubs, and a field winding wound on said sleeve to be carried thereby, said field winding being disposed in said cavities between said pole pieces and said hubs of said rotor portions.

4. An alternator including in combination, a housing, armature winding means disposed withing said housing, a drive shaft centrally of said housing and having a pair of rotor portions mounted thereon, each of said rotor portions comprising a projecting hub and a plurality of integral pole pieces extending therefrom and defining a cavity between said pole pieces and said hub, said rotor portions being axially aligned with said hubs in abutting relation and said pole pieces of said rotor portions intermeshed with each other, each of said hubs having an axial key groove in the periphery thereof with said grooves being in mutual alignment, a sleeve surrounding the periphery of said abutting hubs and having key means extending inwardly therefrom and into said aligned grooves, said key grooves in said rotor portions being aligned with each other and being of a size to receive the inwardly extending key means on said sleeve, said key means cooperating with said grooves in said rotor portions to maintain a predetermined and constant mutual alignment of said rotor portions with respect to each other when assembled and to prevent rotary displacement of said sleeve with respect to said rotor portions and to prevent rotary displacement of said rotor portions with respect to each other, and a field winding on said sleeve and disposed in said cavities between said pole pieces and said hubs of said rotor portions.

References Cited by the Examiner

UNITED STATES PATENTS

| | | | |
|---|---|---|---|
| 646,147 | 3/1900 | Joel | 310—263 X |
| 3,130,355 | 4/1965 | Younger | 29—155.58 X |

MILTON O. HIRSHFIELD, *Primary Examiner.*

J. J. SWARTZ, *Assistant Examiner.*